(12) United States Patent
Després

(10) Patent No.: US 8,696,011 B2
(45) Date of Patent: Apr. 15, 2014

(54) TRAILER-HITCH SYSTEM AND METHOD

(76) Inventor: Jean Després, St-Antonin (CA)

( * ) Notice: Subject to any disclaimer, the term of this patent is extended or adjusted under 35 U.S.C. 154(b) by 104 days.

(21) Appl. No.: 12/908,039

(22) Filed: Oct. 20, 2010

(65) Prior Publication Data

US 2011/0089669 A1 Apr. 21, 2011

Related U.S. Application Data

(60) Provisional application No. 61/253,233, filed on Oct. 20, 2009.

(51) Int. Cl.
B60D 1/40 (2006.01)
(52) U.S. Cl.
USPC .......... 280/478.1; 280/495; 280/506
(58) Field of Classification Search
USPC .................. 280/506, 495
See application file for complete search history.

(56) References Cited

U.S. PATENT DOCUMENTS

| | | | | |
|---|---|---|---|---|
| 2,280,662 A * | 4/1942 | Pawsat | ............................ | 403/370 |
| 3,194,467 A * | 7/1965 | Goonan et al. | ................... | 228/50 |
| 3,971,186 A * | 7/1976 | Havelka et al. | ............ | 403/374.4 |
| 5,244,133 A * | 9/1993 | Abbott et al. | ................... | 224/521 |
| 5,333,888 A * | 8/1994 | Ball | ............................... | 280/504 |
| 5,423,566 A * | 6/1995 | Warrington et al. | ........ | 280/415.1 |
| 5,690,260 A * | 11/1997 | Aikins et al. | ................... | 224/505 |
| 6,142,502 A * | 11/2000 | Breslin | ......................... | 280/506 |
| 6,598,897 B1 * | 7/2003 | Patti | .............................. | 280/507 |
| 6,835,021 B1 * | 12/2004 | McMillan | ................... | 403/374.4 |
| 6,974,147 B1 * | 12/2005 | Kolda | ............................ | 280/506 |
| 7,004,491 B1 * | 2/2006 | Allsop et al. | ................... | 280/506 |
| 7,093,845 B1 * | 8/2006 | Fast | ............................... | 280/489 |
| 2006/0208456 A1 * | 9/2006 | Weaver | ....................... | 280/491.5 |
| 2009/0230656 A1 * | 9/2009 | Blakley | ......................... | 280/504 |
| 2010/0096424 A1 * | 4/2010 | Kuschmeader et al. | ....... | 224/509 |
| 2010/0283225 A1 * | 11/2010 | Lahn | ............................. | 280/506 |

* cited by examiner

Primary Examiner — J. Allen Shriver, II
Assistant Examiner — Conan Duda
(74) Attorney, Agent, or Firm — Cantor Colburn LLP

(57) ABSTRACT

A trailer-hitch system comprises a hitch frame adapted to be secured to a vehicle and having a receiver for accommodating a foremost end of a mount unit. The mount unit has a member portion in mating engagement with the receiver of the hitch frame. A connector for connection with a trailer is provided at a rearmost end. The trailer-hitch system also comprises a mechanism actuated to press a portion of the member portion against the receiver for locking the mount unit into the mating engagement with the receiver. A method for locking a mount unit in a receiver of a hitch frame is also provided.

8 Claims, 6 Drawing Sheets

TRAILER-HITCH SYSTEM AND METHOD

CROSS-REFERENCE TO RELATED APPLICATION

The present application claims priority on U.S. Patent Application Ser. No. 61/253,233, filed on Oct. 20, 2009, incorporated herein by reference.

FIELD OF THE APPLICATION

The present application pertains to trailer-hitch systems and more particularly, but not exclusively, to trailer-hitch systems having a removable coupling mount such as trailer-hitch systems with a ball mount.

BACKGROUND OF THE ART

Trailer-hitch systems are commonly used in non-commercial and recreational vehicles in order to attach a trailer to the vehicle. Trailer-hitch systems typically have a hitch frame that is secured to a frame of the vehicle, a coupling mount being provided on the hitch frame for interfacing with a corresponding coupler of a trailer. One well known type of connector for a trailer-hitch system is the hitch ball. The hitch ball is advantageously used in that it forms a joint with the coupler allowing at least two rotational degrees of freedom. This allows movements of the trailer with regard to the vehicle. Other types of connectors are usable as well with trailer-hitch systems.

The connector ball (i.e., hitch ball) is typically provided on a removable mount. One of the reasons for the removable feature of the connector is that the connector typically projects rearwardly of the bumper. Therefore, if the connector is not removed from the vehicle, it may damage adjacent vehicles in case of a contact, for instance during parking. However, due to the loads on the mount, any space between the mount and a receiver of the trailer-hitch system may cause rattling or unwanted vibrations. Such vibrations may result in annoying noises, as well as premature damage to the mount.

SUMMARY OF THE APPLICATION

It is therefore an aim of the present application to provide a trailer-hitch system that addresses issues associated with the prior art.

Therefore, in accordance with the present application, there is provided a trailer-hitch system comprising: a hitch frame adapted to be secured to a vehicle and having a receiver for accommodating a foremost end of a mount unit; a mount unit having a member portion in mating engagement with the receiver of the hitch frame and having at a rearmost end a connector for connection with a trailer; and a mechanism actuated to press a portion of the member portion against the receiver for locking the mount unit into the mating engagement with the receiver.

Further in accordance with the present application, there is provided a method for locking a mount unit in a receiver of a hitch frame, comprising: matingly engaging the member portion of the mount unit into a receiver of the hitch frame; threading a hitch pin through the receiver and the mount unit; and pressing the member portion radially against an inner surface of the receiver by actuating a mechanism to lock the mount unit in the receiver.

DESCRIPTION OF THE PREFERRED EMBODIMENTS

Figure 1:
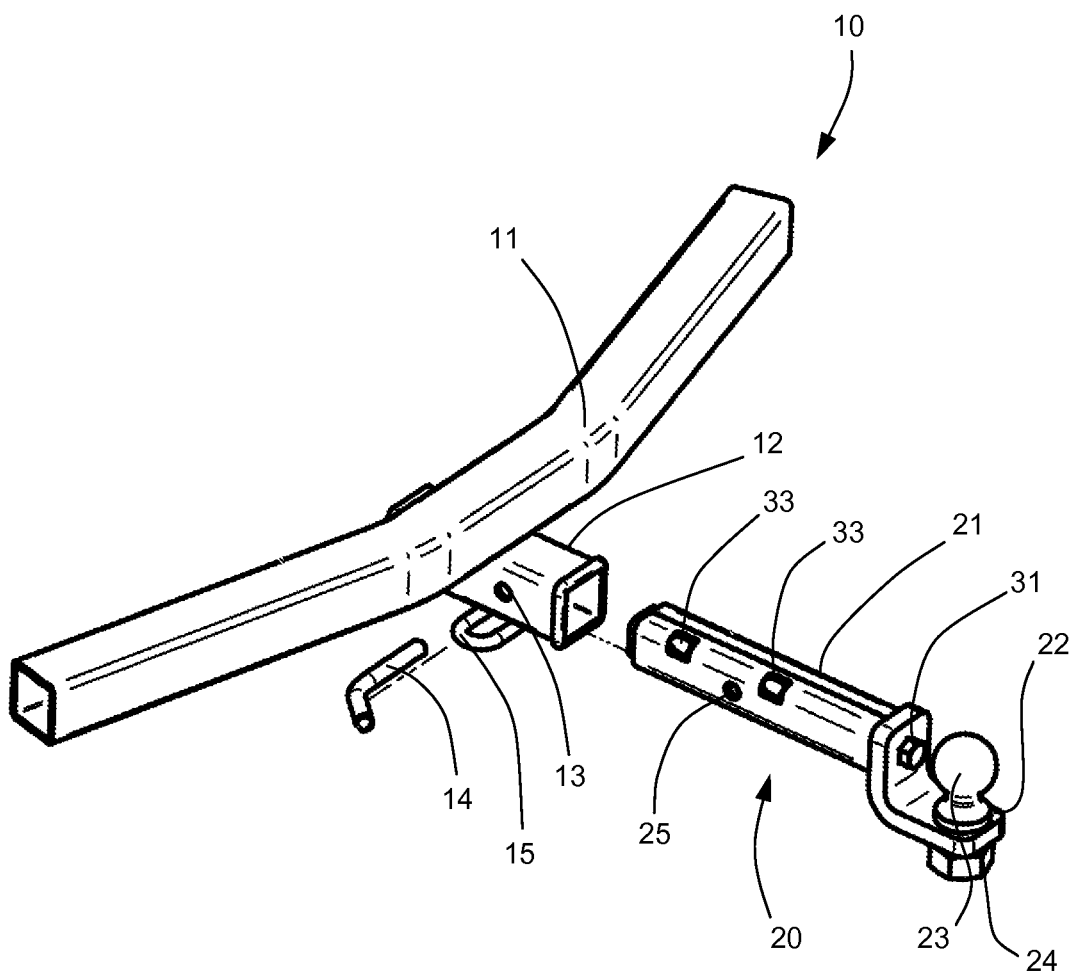
FIG. 1 is an assembly perspective view of a trailer-hitch system in accordance with an embodiment of the present disclosure.

Referring to the drawings, and more particularly to FIG. 1, a trailer-hitch system in accordance with the present disclosure is generally shown at 10. The trailer-hitch system 10 has a hitch frame 11, that is shown sectioned at opposed ends. The hitch frame 11 is secured at opposed ends to a frame of a car. For simplicity purposes, the connector ends of the hitch frame 11 are not illustrated, but may be of any configuration as a function of the vehicle to which they are secured. The hitch frame 11 may have any shape so as to be secured to the vehicle.

A receiver 12 is transversely positioned with respect to the hitch frame 11. The receiver 12 accommodates an end of a connector mount. Therefore, the receiver 12 is preferably tubular. In FIG. 1, the receiver 12 is illustrated as being a generally square-section receiver, although other sectional shapes are considered as well. A throughbore is provided in the square-section receiver 12, and is illustrated as 13. The throughbore 13 receives a hitch pin 14 so as to lock a connector mount therein.

A hook 15 may be provided, for instance to lock a trailer to the trailer-hitch system 10. A lock (not shown) connects into the hook 15 and therefore blocks the hitch pin 14 in the throughbore 13.

Figure 2:
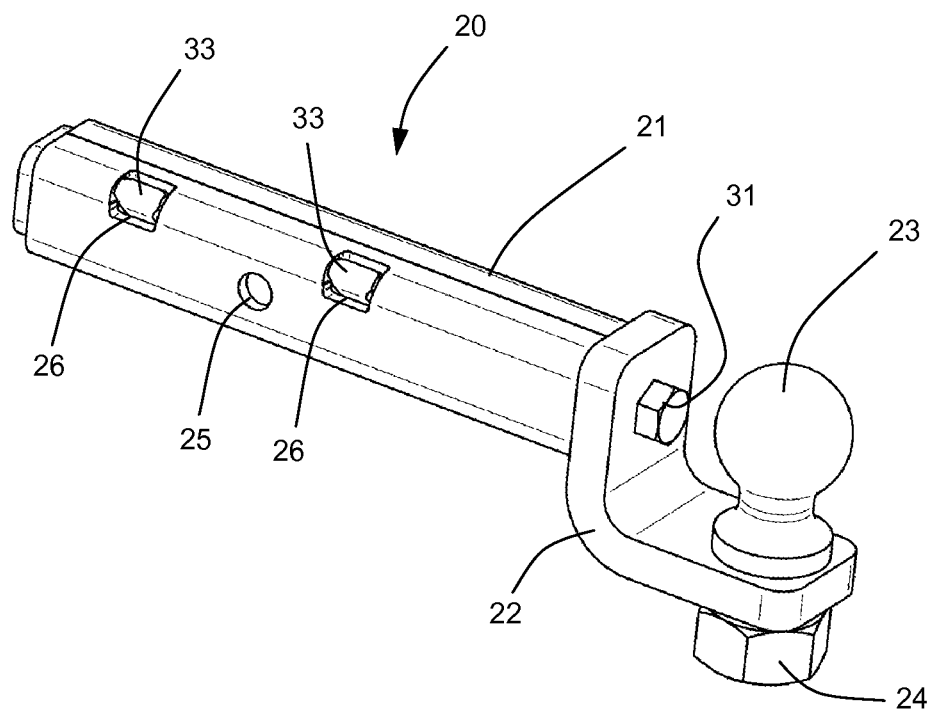
FIG. 2 is a perspective view of a ball-mount unit of the trailer-hitch system of FIG. 1, with abutments in a retracted position.

Referring concurrently to FIGS. 1 and 2, a ball-mount unit 20 is sized so as to be matingly received in the square-section receiver 12. The ball-mount unit 20 has a member 21 that is complementarily shaped so as to be accommodated in the receiver 12. A bracket 22, herein a right-angle bracket, is secured to a rearmost end of the member 21. The bracket 22 supports a connector, such as hitch ball 23. Other types of connectors may be used as alternatives to the hitch ball 23 with the mount unit 20. As illustrated in FIG. 2, the hitch ball 23 is connected to the bracket 22 by a bolt 24.

Referring to FIG. 2, the member 21 is preferably a tube having a pinhole 25. The pinhole 25 is positioned and sized so as to be aligned with the throughbore 13 when the unit 20 is in the receiver 12, for the hitch pin 14 to be passed therethrough. A pair of openings 26 are also defined in the member 21, so as to allow radial movement of abutments with respect to the member 21, as will be described hereinafter.

Figure 3:
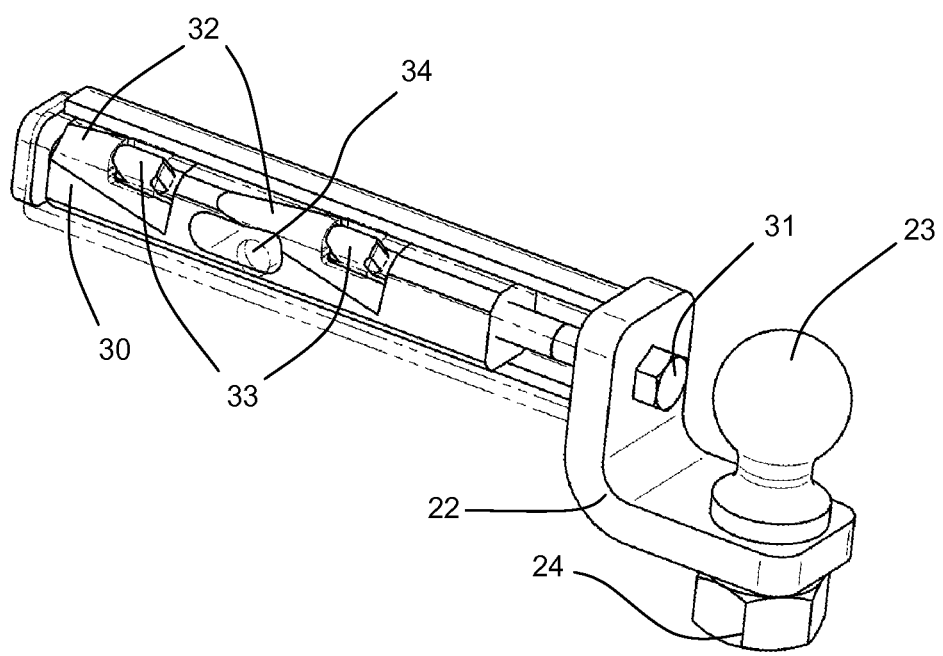
FIG. 3 is a perspective view, fragmented, of the ball-mount unit of FIG. 2, showing an interior thereof.

Referring to FIG. 3, a wedge bar 30 is inserted into the member 21, and may move axially therein. More specifically, the wedge bar 30 is in threaded relation with an actuator bolt 31, with the actuator bolt 31 being idled to the bracket 22. Therefore, rotation of the actuator bolt 31 results in the axial movement of the wedge bar 30 in the member 21. The wedge bar 30 features a pair of wedge surfaces 32 (i.e., at least one), with the wedge surfaces 32 being in a wedged orientation with respect to a longitudinal axis of the wedge bar 30. Other actuation configurations are considered in alternatives to the threading engagement to actuate the translation movement of the wedge bar 30 in the member 21, such as pistons, levers, two-bar linkages or the like.

Figure 4A:
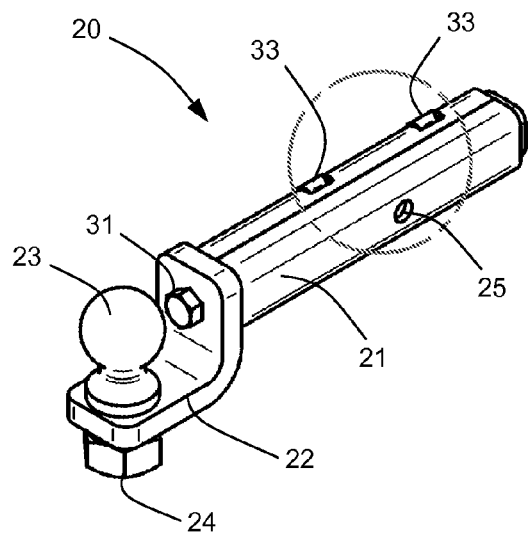
FIG. 4A is a perspective view of the ball-mount unit from another standpoint, with the abutments in the retracted position.
Figure 4B:
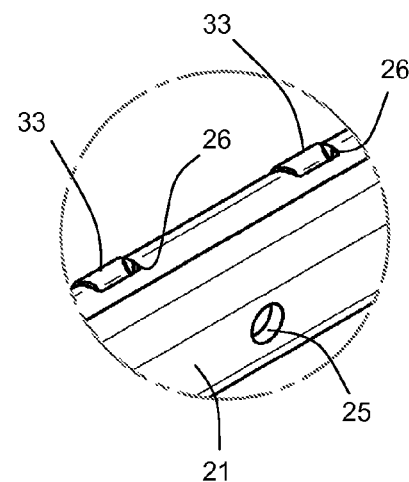
FIG. 4B is an enlarged view of the ball-mount unit of FIG. 4A, emphasizing the abutments in the retracted position.
Figure 5A:
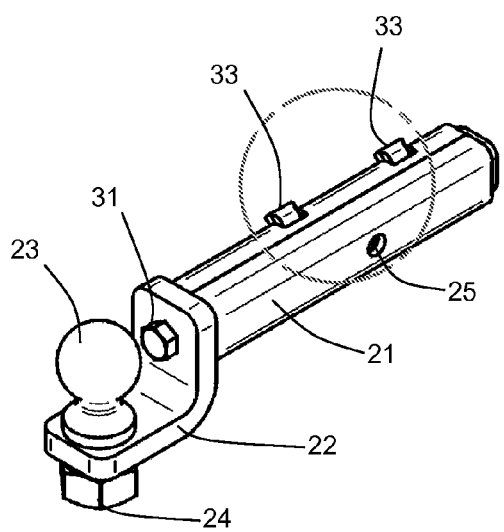
FIG. 5A is a perspective view of the ball-mount unit of FIG. 4A, with the abutments in a projecting position.
Figure 5B:
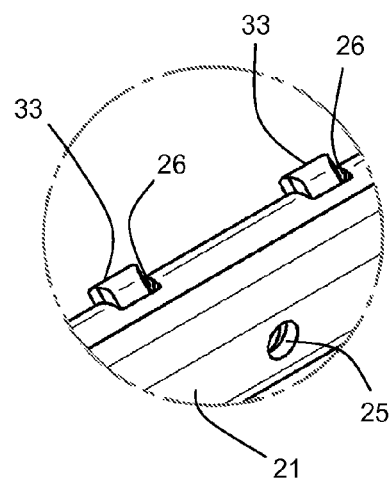
FIG. 5B is an enlarged view of the ball-mount unit of FIG. 5A, emphasizing the abutments in the projecting position.
Figure 6:
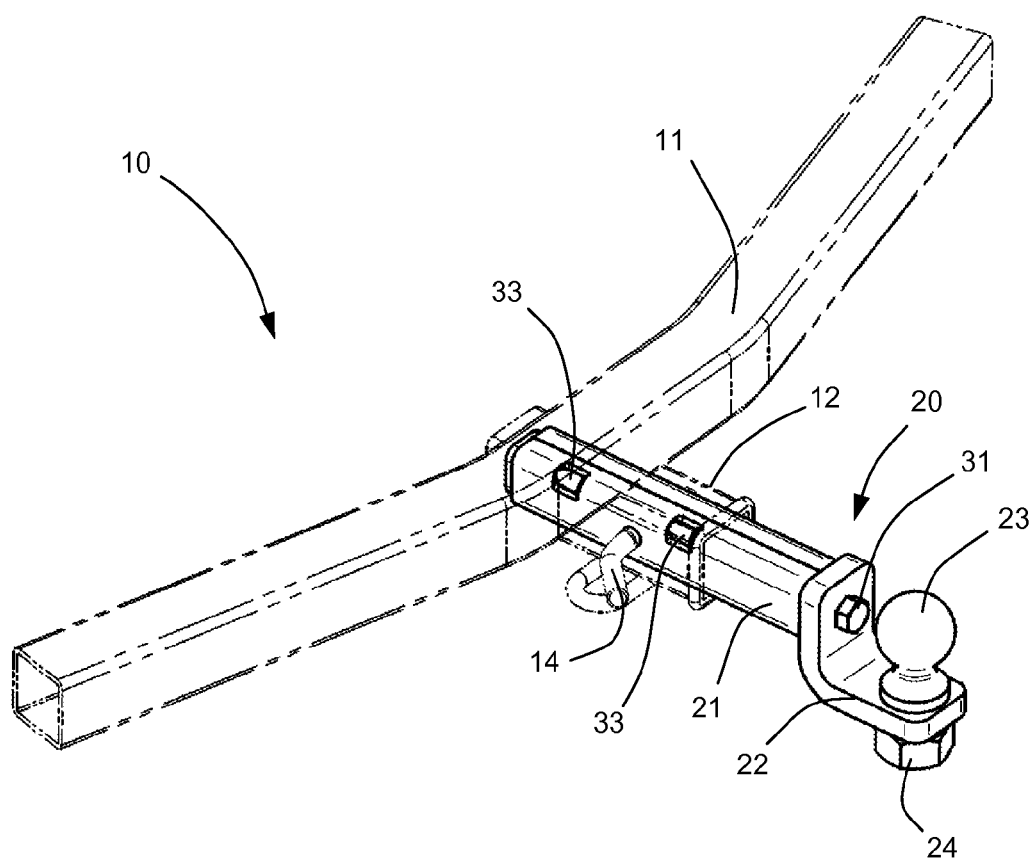
FIG. 6 is a perspective view of the trailer-hitch system of FIG. 1, with the ball-mount unit coupled to a receiver of the hitch frame.

Abutments 33 are in sliding engagement with the wedge surfaces 32. Moreover, the abutments 33 are held captive in the member 21. Therefore, a translation of the wedge bar 30 with respect to the member 21 will cause a radial projection or retraction of the abutments 33 as a result of the sliding engagement of the abutments 33 on the wedge surfaces 32. Referring concurrently to FIGS. 4A and 4B, it is shown that the abutments 33 are in a retracted position. Referring to FIGS. 5A and 5B, it is observed that the abutments 33 are in a projecting position with the abutments 33 shown as projecting from a side edge (corner) of the member 21 (i.e., at intersection of side surfaces of the member 21) to press against an inner corner of the receiver 21. The abutments 33 may have a resilient coating (e.g. rubber, polymers), with the resilient coating being of relatively high hardness for the use of the abutments 33.

Still referring to FIG. 3, it is shown that slot 34 has an oblong section. The oblong section is provided so as to allow the translational movement of the wedge bar 30 in the member 21, despite the pin 14 (FIG. 1) being in the pinhole 25.

Now that the various components of the trailer-hitch system 10 have been described, a method for using the trailer-hitch system is set forth. Firstly, the ball-mount unit 20 is inserted into the receiver 12. More specifically, the member 21 is matingly fitted into the square-section receiver 12. In order to insert the ball-mount unit 20 into the receiver 12, the abutments 33 must be in the retracted position, as shown in FIGS. 4A and 4B. When the pinhole 25 is aligned with the throughbore 13, the hitch pin 14 is inserted into the throughbore 13 to lock the ball-mount unit 20 in position in the receiver 12. When the hitch pin 14 is in the throughbore 13 and pinholes 25, the abutments 33 are moved to their projecting position (FIGS. 4A and 4B). More specifically, a tool such as a wrench or ratchet is used to rotate the actuator bolt 31 in the appropriate direction. This will cause a translation of the wedge bar 30, and thus the radially outward movement of the abutments 33 to the projecting position. The abutments 33 will press against an inner surface of the receiver 12, thereby blocking the member 21 to the receiver 12 by friction. The trailer may then be hitched to the hitch ball 23, although the trailer may also be hitched at any appropriate moment after the member 21 is received in the receiver 12.

In order to remove the ball-mount unit 20, the actuator bolt 31 is rotated in the opposite direction, so as to cause a radially inward movement of the abutments 33. The trailer may be unhitched from the ball-mount unit 20 before the removal of the ball-mount unit 20.

Figure 7:
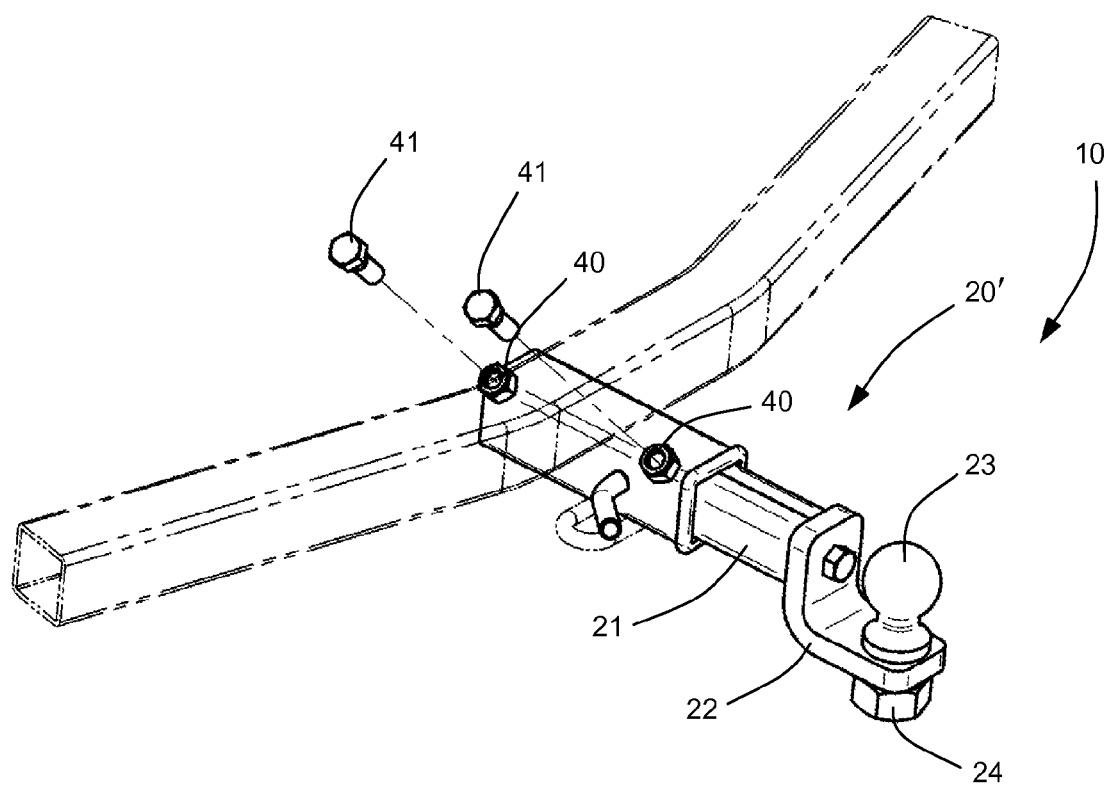
FIG. 7 is a perspective view of a trailer-hitch system in accordance with another embodiment of the present disclosure.
Figure 8:
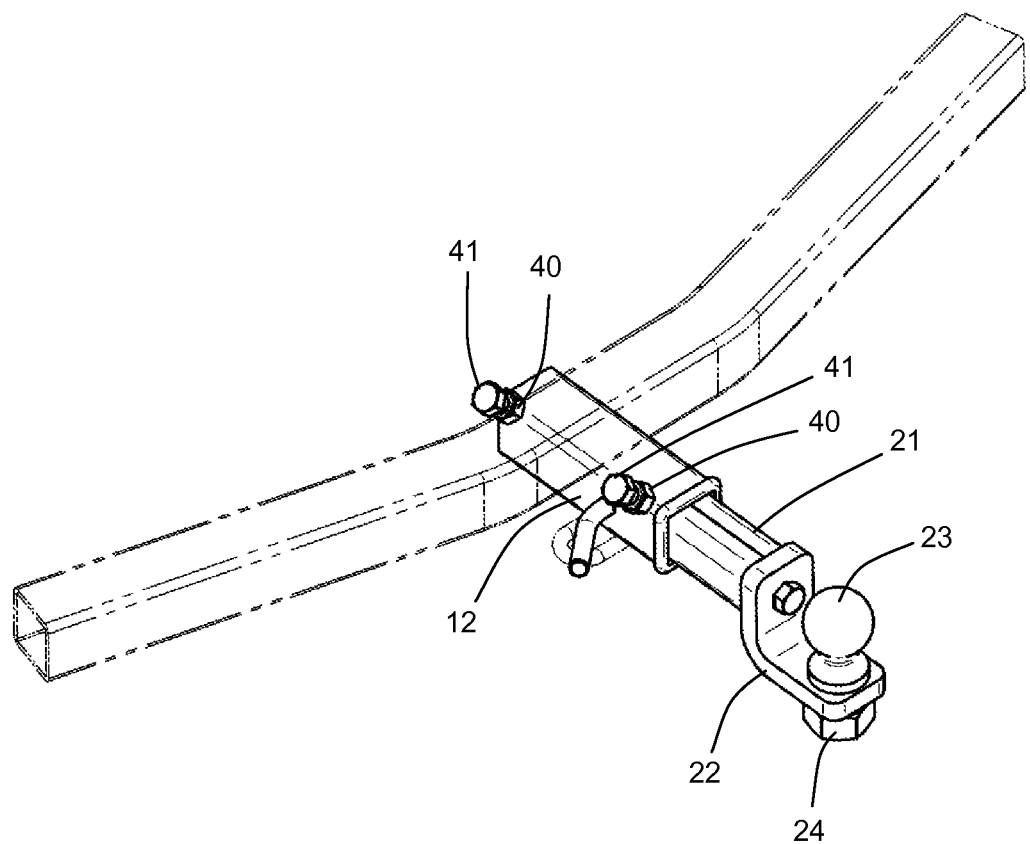
FIG. 8 is a perspective view of the trailer-hitch system of FIG. 7, with locking bolts locking a ball-mount unit coupled to a receiver.

In FIGS. 7 and 8, there is illustrated an alternative to the wedge mechanism shown in FIGS. 1 to 6. In FIGS. 7 and 8, nuts 40 are provided on an exterior surface of the receiver 12. Accordingly, bolts 41 are screwed through the nuts 40 and into the receiver 12, so as to press the member 21 against an inner surface of the receiver 12. The free ends of the bolts 41 may be provided with a resilient tip, in a fashion similar to that of the resilient coating of the abutments 33. As a result, the ball-mount unit 20' is locked to the receiver 12. Any similar mechanism may be used as well.

The invention claimed is:

1. A trailer-hitch system comprising:
a hitch frame adapted to be secured to a vehicle and having a receiver for accommodating a foremost end of a mount unit, the receiver of the hitch frame being tubular and having a polygonal cross-section;
a mount unit having a member portion in mating engagement with the receiver of the hitch frame and having at a rearmost end a connector for connection with a trailer, the member portion being tubular and having a polygonal cross-section corresponding to that of the receiver; and
a mechanism actuated to press a portion of the member portion against the receiver for locking the mount unit into the mating engagement with the receiver, the mechanism comprising a wedge bar slidingly engaged for axial displacement in the member portion with the wedge bar having at least one wedge surface, at least two abutments operatively contacting the at least one wedge surface and accommodated in respective openings of the member portion, the openings being defined in an edge of the member portion at a junction between a pair of side surfaces, the abutments moving between a projecting position wherein the abutments project out of the edge of the member portion and against an inner corner of the receiver to press the member portion against two surfaces of the receiver, and a retracted position wherein the abutment is retracted within the member portion, as a result of axial displacement of the wedge bar in the member portion.

2. The trailer-hitch system according to claim 1, wherein the wedge bar has a pair of the wedge surfaces.

3. The trailer-hitch system according to claim 1, further comprising a threaded connector securely idled to the mount unit, and in threading engagement with the wedge bar for actuation of the axial displacement of the wedge bar in the member portion.

4. The trailer-hitch system according to claim 3, wherein the threaded connector is a bolt, with a bolt head projecting out of a rearmost end of the member portion for manual actuation.

5. The trailer-hitch system according to claim 4, comprising a bracket fixed to the rearmost end of the member portion, with the bolt being securely idled to the bracket.

6. The trailer-hitch system according to claim 5, wherein a ball hitch is secured to another wall of the bracket.

7. The trailer-hitch system according to claim 4, wherein a rotational axis of the threaded connector is coincident with a longitudinal axis of the member portion.

8. The trailer-hitch system according to claim 1, further comprising a hitch pin, wherein the receiver has a throughbore, the member portion has a pinhole, and the wedge bar has an obround slot, with the throughbore, the pinhole and the obround slot being in register during mating engagement of the mount unit in the receiver for being locked in mating engagement by the hitch pin.

\* \* \* \* \*